(12) United States Patent
Muukki et al.

(10) Patent No.: US 8,314,865 B2
(45) Date of Patent: Nov. 20, 2012

(54) LENS SHADING CORRECTION

(75) Inventors: Mikko Muukki, Tampere (FI); Mikko Ollila, Tampere (FI)

(73) Assignee: Nokia Corporation, Espoo (FI)

( * ) Notice: Subject to any disclaimer, the term of this patent is extended or adjusted under 35 U.S.C. 154(b) by 314 days.

(21) Appl. No.: 12/645,990

(22) Filed: Dec. 23, 2009

(65) Prior Publication Data

US 2011/0149112 A1   Jun. 23, 2011

(51) Int. Cl.
*H04N 5/243* (2006.01)
(52) U.S. Cl. ............... 348/251; 348/208.4; 348/208.12
(58) Field of Classification Search .................... 348/251, 348/208.99, 208.4, 208.5, 208.6, 208.7, 208.8, 348/208.11, 208.12, 208.16
See application file for complete search history.

(56) References Cited

U.S. PATENT DOCUMENTS

| | | | |
|---|---|---|---|
| 7,297,916 B1 | 11/2007 | Feng | |
| 7,505,067 B2 * | 3/2009 | Ogawa et al. | 348/208.4 |
| 2004/0125227 A1 * | 7/2004 | Tsuruoka et al. | 348/340 |
| 2004/0201707 A1 * | 10/2004 | Noguchi et al. | 348/208.7 |
| 2006/0087707 A1 * | 4/2006 | Akaho | 358/518 |
| 2007/0030379 A1 | 2/2007 | Agranov | |
| 2007/0071426 A1 | 3/2007 | Chujo et al. | |
| 2007/0103555 A1 | 5/2007 | Eromaki | |
| 2007/0146489 A1 | 6/2007 | Kosako et al. | |
| 2008/0278613 A1 | 11/2008 | Hunter et al. | |
| 2008/0284879 A1 | 11/2008 | Hu | |
| 2008/0291299 A1 | 11/2008 | Kano | |
| 2008/0309772 A1 | 12/2008 | Ikeda | |
| 2009/0021632 A1 | 1/2009 | Huggett | |
| 2009/0160959 A1 | 6/2009 | Watanabe et al. | |
| 2009/0252488 A1 | 10/2009 | Eromaki et al. | |
| 2009/0268053 A1 | 10/2009 | Wang et al. | |

FOREIGN PATENT DOCUMENTS

| | | |
|---|---|---|
| EP | 1729509 | 12/2006 |
| EP | 1936956 | 6/2008 |
| EP | 2058763 | 5/2009 |
| JP | 2004048346 A * | 2/2004 |
| JP | 2005269130 A * | 9/2005 |
| WO | WO2008005595 | 1/2008 |
| WO | WO2008130882 | 10/2008 |

OTHER PUBLICATIONS

"OmniVision CRA Correction, Matching Senors to Lenses for Better Imaging", Jun. 2009, 16 pages (a web document publicly available at http://space.ednchina.com/upload/2009/9/8/b1a17f54-0639-4644-b9ad-8681931f128f.pdf).

* cited by examiner

*Primary Examiner* — Jason Whipkey
(74) *Attorney, Agent, or Firm* — Locke Lord LLP

(57) ABSTRACT

A method including using an optical image stabilization function in an imaging apparatus comprising a lens and an image sensor; acquiring system change information, the system change information concerning changes that affect optical path through the lens to the image sensor during capturing of an image through the lens; adjusting a lens shading correction function on the basis of the acquired system change information; and applying the adjusted lens shading correction function to image data representing the captured image.

15 Claims, 4 Drawing Sheets

LENS SHADING CORRECTION

TECHNICAL FIELD

The present invention generally relates to digital photography and more particularly, but not exclusively to lens shading correction.

BACKGROUND ART

Small camera modules often suffer from a phenomenon called lens shading. This is caused by properties of optics (lens) and micro lenses of an image sensor of the camera module. Severity of the problem is somewhat relational to how big the chief ray angle in micro lens aperture is, the chief ray angle being the angle of the incident rays passing through the center of the micro lens aperture. Different colours (green, blue, red) have different response in the micro lens and this can cause visible flaws in the resulting image. Lens shading is typically corrected for example by using calibrated 2D LUT (two dimensional look-up table) based lens shading correction.

SUMMARY

According to a first example aspect of the invention there is provided a method comprising:
using an optical image stabilization function in an imaging apparatus comprising a lens and an image sensor;
acquiring system change information, the system change information concerning changes that affect optical path through the lens to the image sensor during capturing of an image through the lens;
adjusting a lens shading correction function on the basis of the acquired system change information; and
applying the adjusted lens shading correction function to image data representing the captured image.

According to a second example aspect of the invention there is provided an apparatus comprising:
a lens and an image sensor configured to capture images and to provide image data representing captured images;
a stabilization unit configured to control optical path through the lens to the image sensor during capturing of images through the lens to provide optical image stabilization;
a processing unit configured to cause the apparatus to perform acquiring system change information, the system change information concerning changes that affect the optical path through the lens to the image sensor during capturing of an image through the lens;
adjusting a lens shading correction function on the basis of the acquired system change information; and
applying the adjusted lens shading correction function to the image data representing the captured image.

According to a third example aspect of the invention there is provided a camera module comprising:
a lens and an image sensor configured to capture images and to provide image data representing captured images;
a stabilization unit configured to control optical path through the lens to the image sensor during capturing of images through the lens to provide optical image stabilization; wherein
the stabilization unit is configured to record, during capturing of an image, system change information concerning changes that affect optical path through the lens to the image sensor, and to provide the system change information for use in further processing.

According to a fourth example aspect of the invention there is provided a computer program comprising computer executable program code which, when executed by at least one processor of an apparatus, causes the apparatus to perform:
acquiring system change information, the system change information concerning changes that affect optical path through a lens to an image sensor during capturing of an image through the lens;
receiving image data representing the image captured through the lens;
adjusting a lens shading correction function on the basis of the acquired system change information; and
applying the adjusted lens shading correction function to the image data.

According to yet another example aspect of the invention there is provided a memory medium or computer readable medium carrying the computer program of the fourth example aspect.

Different non-binding example aspects of the present invention have been illustrated in the foregoing.

BRIEF DESCRIPTION OF THE DRAWINGS

The invention will be described, by way of example only, with reference to the accompanying drawings, in which.

DETAILED DESCRIPTION

Reference in the specification to "one embodiment" or "an embodiment" or "an example embodiment" means that a particular feature, structure, or characteristic described in connection with the embodiment is included in at least one embodiment of the invention. The appearances of the phrase "in an embodiment" in various places in the specification are not necessarily all referring to the same embodiment, nor are separate or alternative embodiments mutually exclusive of other embodiments.

Optical Image Stabilization or Optical Image Stabilizer, often abbreviated as OIS or OS or IS, is a mechanism used in a still camera or a video camera for stabilizing the recorded image by varying the optical path through the camera lens to the image sensor. The image stabilizer counteracts human handshake in order to keep the resulting image within the same position despite of human handshake. The stabilizer technology may be built in the lens or in the camera.

In general the stabilizer technology is based on changing the position of the camera lens (the lens system) or part of the camera lens system or position of the image sensor as appropriate during image capture. The position may be changed in XY plane, but also in other dimensions. Instead of changing position the desired effect may be achieved by varying properties of the optics as appropriate. More specifically, the technology may be based on one of the following:

1. Lens system shift. All lenses in the camera lens system are shifted in relation to the image sensor in order to vary the optical path.
2. Lens shift or partial lens system correction. In this case, not all lenses in the camera lens system are necessarily shifted. Instead there is are one or more correction lenses that are shifted in order to vary the optical path. In another option a correction lens may be such that its optical power is changed in order to vary the optical path.
3. Lens system tilt or lens tilt or variable prism. Lens or lens system (one or more lenses) is tilted in relation to the image sensor in order to vary the optical path. The tilting effect can be obtained by using a variable prism in the lens system, for example.
4. Sensor shift. The image sensor is shifted in relation to the lens in order to vary the optical path.

In the following the term lens may refer to a whole lens system or to an individual lens in the system.

As a result of the OIS functionality the chief ray angle changes in practise for every image. This may cause problems in combination with lens shading correction as lens shading correction is typically designed for one specific scenario with certain chief ray angle.

Figure 1A:
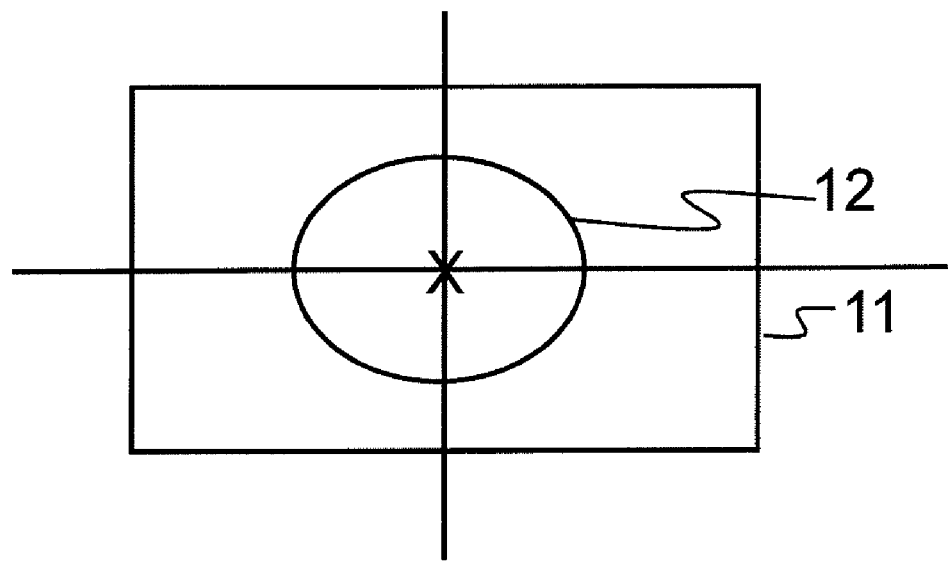
FIG. 1A illustrates an example of taking an image without optical image stabilization.

FIG. 1A illustrates an example of taking an image without optical image stabilization (=OIS OFF). The image 12 is generated to the middle of a camera module 11. The center of the image 12 is marked with an X.

Figure 1B:
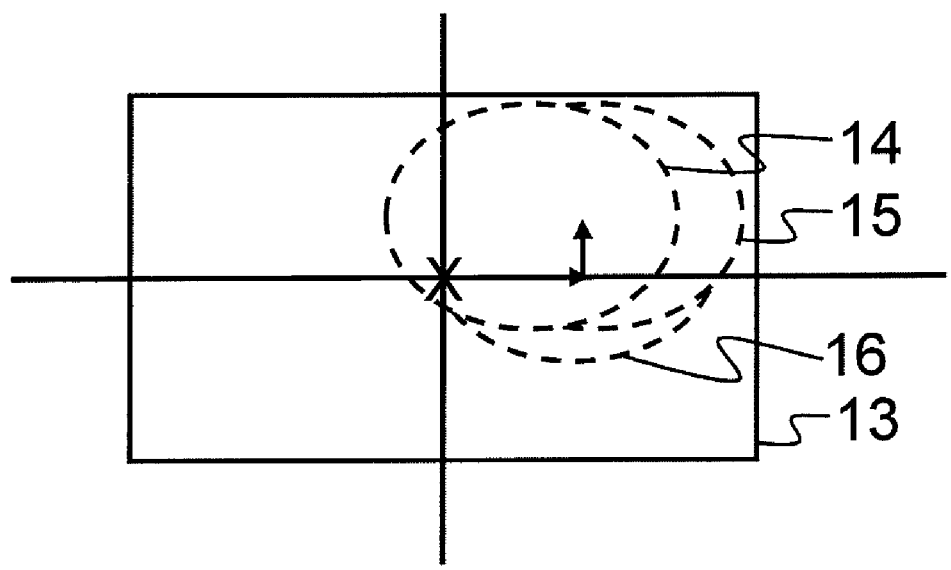
FIG. 1B illustrates an example of taking an image with optical image stabilization.

FIG. 1B illustrates an example of taking an image with optical image stabilization (=OIS ON). Image stabilization may be needed for example due to human handshake. Now it is assumed that a lens operates only in upper right corner of a camera module 13 as a result of the OIS functionality. Dashed circles 14-16 and arrows illustrate movements of the lens during image capture. The lens moves to +x, +y position to correct +yaw and +pitch tilt angles caused by handshake. In this way the resulting image captures the same subject matter as in FIG. 1A (or without human handshake) thanks to the OIS functionality.

Correspondingly, the lens may move to −x, −y position to correct −yaw and −pitch tilt angles, or to −x, +y position to correct −yaw and +pitch tilt angles, or to +x, −y position to correct +yaw and −pitch tilt angles.

Like mentioned in background section lens shading depends on chief ray angle in micro lens aperture. The chief ray angle changes, when lens is shifted or tilted, i.e. the OIS functionality causes changes in chief ray angle. For this reason it is likely that lens shading experienced in scenarios of FIGS. 1A and 1B are different. The difference may depend for example on the distance between the lens or lens system positions (the dashed circles in FIG. 1B) and a default position in the center of the camera module (marked with an X in FIG. 1B). Therefore lens shading correction designed for the scenario shown in FIG. 1A is not likely to provide optimal result in the scenario of FIG. 1B. It is possible that lens shading correction designed for the scenario shown in FIG. 1A results in visible flaws if used in the scenario of FIG. 1B.

In an example embodiment it is assumed that shading performance changes in proportion to the lens position difference in the XY plane or difference in lens tilting angle. This assumption may be suitable for example for tele-centric lenses or in scenarios with less aggressive chief ray angle. For example, if X axis difference in the lens position is 150 um, then shading in that point would be the same as in OIS OFF case in coordinates of X=150 um (assuming Y axis difference=0).

In an example embodiment, changes that affect optical path are actively tracked or monitored during image capture. For example, the position of a camera lens in relation to an image sensor may be actively tracked or monitored during image capture. These changes (e.g. the position information or optical properties) are then used to adjust lens shading correction function that will be used for correcting the shading in the captured image.

Figure 2:
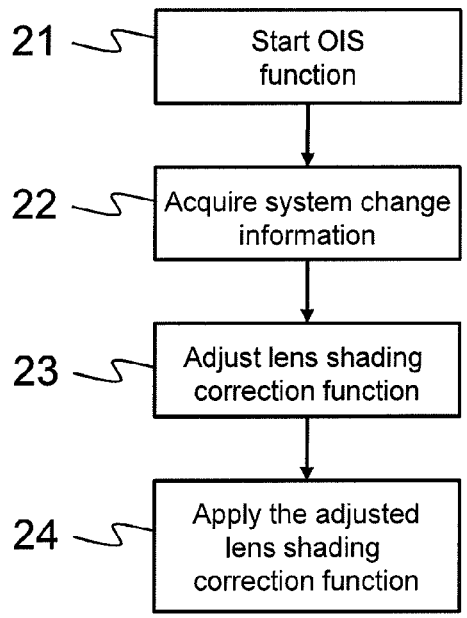
FIG. 2 shows a flow chart according to an example embodiment.

FIG. 2 shows a flow chart according to an example embodiment.

In phase 21, OIS function is started. Then in phase 22, system change information is acquired during image capture. The system change information concerns changes affecting the optical path through a camera lens to an image sensor and may concern position of the lens or part of the lens in relation to the image sensor. The system change information may be position information concerning position of the lens in relation to the image sensor or vice versa. The position information may include angle information or distance information, for example. The system change information may be acquired for example by tracking the position of the camera lens in relation to the image sensor. In an example embodiment it is lens position that is tracked. In another example embodiment it is sensor position that is tracked. The position may be tracked in XY-plane. In yet another example embodiment it is tilting angle that is tracked. In still another example embodiment lens or lens system properties, such as changes in optical power of one or more lenses are tracked. In an example embodiment the system change information comprises control information causing changes in optical path through the lens to the image sensor. The actual changes may then be deduced on the basis of the control information. In a yet further embodiment more than one type of system change is tracked at the same time. For example, if both lens shift and sensor shift are used in OIS functionality, both of these changes may be tracked for the purposes of embodiments of the invention.

In phase 23, a lens shading correction function is adjusted based on the system change information. Some example options for performing the adjustment are discussed in more detail below in connection with FIGS. 4-6. Then the adjusted lens shading correction function is applied to the captured image.

Figure 3:
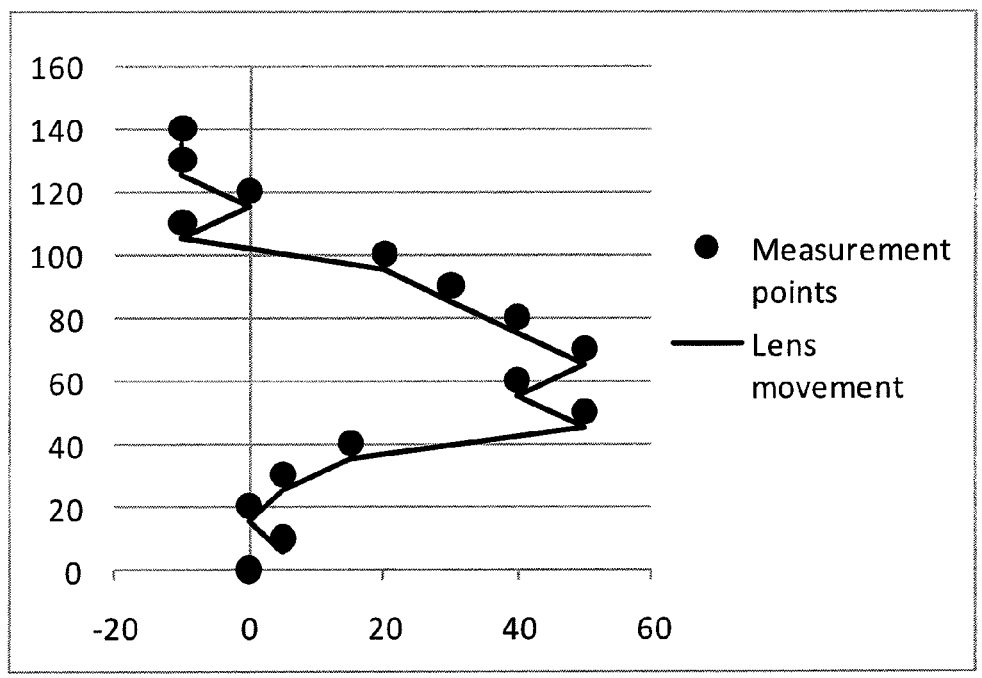
FIG. 3 illustrates lens movements in an example scenario.

FIG. 3 illustrates lens movements in an example scenario. In this example, the lens moves along X-axis during image capture. Clearly it is possible that the lens moves also along Y-axis, but this example shows only movement along X-axis.

X-axis in FIG. 3 shows lens position in urn (micrometers) and Y-axis shows time in ms (milliseconds). The line in the chart shows movement of the lens and the dots show measurement/tracking points, in which position of the lens is measured. In this example, the lens position varies from −10 to +50 um and the lens position is measured once every 10 ms. It is however possible to measure the lens position less frequently or more frequently, e.g. every 1 ms, 5 ms, 15 ms or 30 ms.

In an example embodiment a drive unit controlling optical path between a camera lens and an image sensor is configured to monitor/track and store system change information used for adjusting lens shading correction function.

In an example embodiment the system change information is read from the drive unit after image capture. In another example embodiment the drive unit sends the system change information to the image sensor and the sensor provides the system change information for further processing. The sensor may attach the system change information as metadata to the captured image or use a separate (virtual) channel for providing the information. The system change information may be read or provided for further processing during capturing the image or after having captured the image.

In an example embodiment the drive unit reads the system change information from a position sensor. This can be used for example when a piezo actuator is used to provide the optical image stabilization effect. In another example embodiment the system change information is determined based on a DAC (Digital to Analog Converter) value. This can be used for example when DAC based actuator control (e.g. VCM, Voice Coil Motor) is used in the optical image stabilization. I.e. the control command that is used in the OIS function is used to determine the resulting system changes or position or changes in the position.

In an example embodiment, the system change information or at least the position information is calibrated before it is provided for use in adjusting the lens shading function in order to calibrate the position approximation. In an example embodiment, built-in filtering functions are included in the position monitoring. The filtering functions may depend on characteristics of the OIS functionality that is used. The calibration or the filtering functions are typically performed for the purposes of the OIS functionality and therefore may not cause any additional processing.

A position sensor that is used for position detection for the purposes of the optical image stabilization effect may be a photo reflector or a hall sensor that detects movements of a magnet. The position sensor may include temperature compensation for example in the form of a temperature dependent bias current. Alternatively or additionally, the position sensor may be driven to mechanical extreme position before starting the OIS functionality, The mechanical extreme position represents certain specific correction angle (pitch, yaw) and therefore the effect of environmental factors can be accounted for in this way. Alternatively or additionally, the system may include a separate temperature or orientation sensor and the output of those may be taken into account. Yet further, output signal of the position sensor may be averaged (over a plurality of AD conversions) or the output signal may be filtered.

Figure 4:
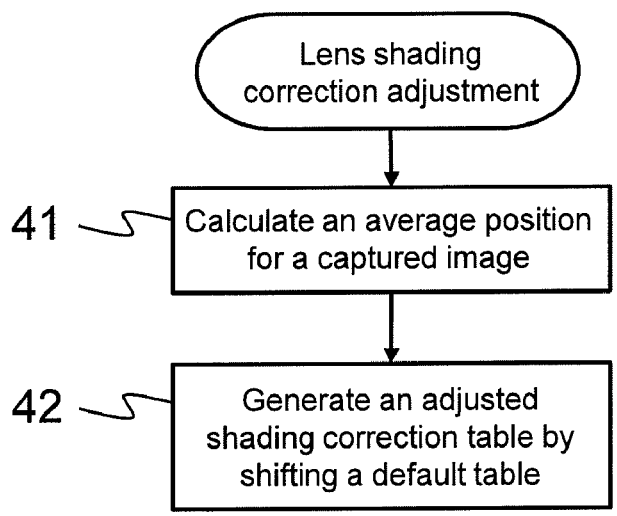
FIG. 4 illustrates lens shading correction adjustment according to an example embodiment.

FIG. 4 illustrates lens shading correction adjustment according to an example embodiment. For example the phase 23 in FIG. 2 may be implemented as shown in FIG. 4.

In phase 41 an average position is calculated for the captured image on the basis of the system change information. Then in phase 42, an adjusted shading correction table is generated by shifting a default correction table by a difference between the calculated average position and a default position of the default correction table.

In an example embodiment different reference shading correction tables are defined for different parts or positions of imaging area. For example upper right hand corner may have own reference table while upper left hand corner may have a different reference table etc. Any suitable number of different reference tables may be defined. All reference tables do not need to cover exactly the same area. Instead certain part of the image area may have many reference tables covering a relatively small area, while another part of the image area may be covered by one reference table. The area covered by the reference tables may overlap at least partially.

Figure 5:
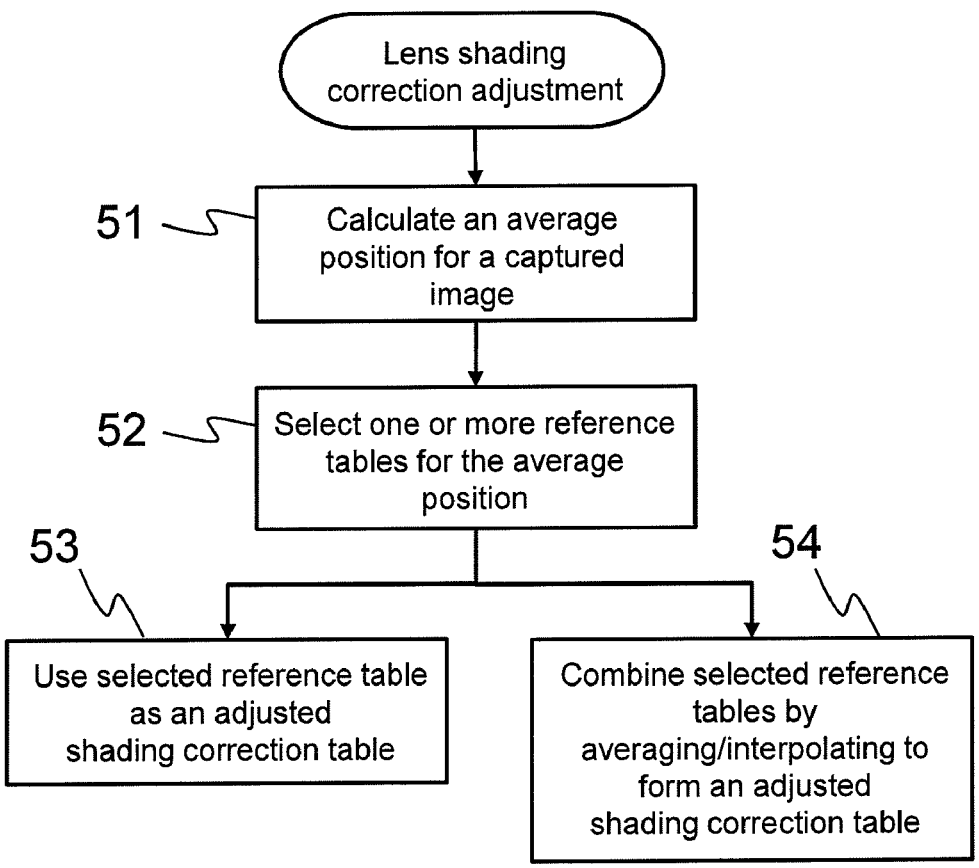
FIG. 5 illustrates lens shading correction adjustment according to another example embodiment.

FIG. 5 illustrates lens shading correction adjustment according to another example embodiment. For example the phase 23 in FIG. 2 may be implemented as shown in FIG. 5.

In phase 51 an average position is determined for the captured image on the basis of the system change information. In phase 52, one or more reference correction tables are selected on the basis of the average position and the selected reference correction tables are used to generate an adjusted shading correction table. The reference correction tables may be selected on the basis of the difference between the determined average position and positions associated with the reference tables. The difference may be distance or angle, for example.

In an example embodiment, if the average position matches one reference table, that reference table is selected and used as the adjusted shading correction table as is (phase 53). For example if the average position is in the upper right hand corner (i.e. OIS operates in the upper right hand corner), a reference table defined for the upper right hand corner is selected and used.

In an example embodiment, if the average position is close to two or more reference tables, the closest reference tables are selected and combined to form the adjusted shading correction table (phase 54. The combination is performed by averaging or interpolating the selected reference correction tables. For example if the average position is in between the upper and lower right hand corners (I.e. OIS operates in upper and lower right hand corners), reference tables defined for upper and lower right hand corners are selected and combined.

Figure 6:
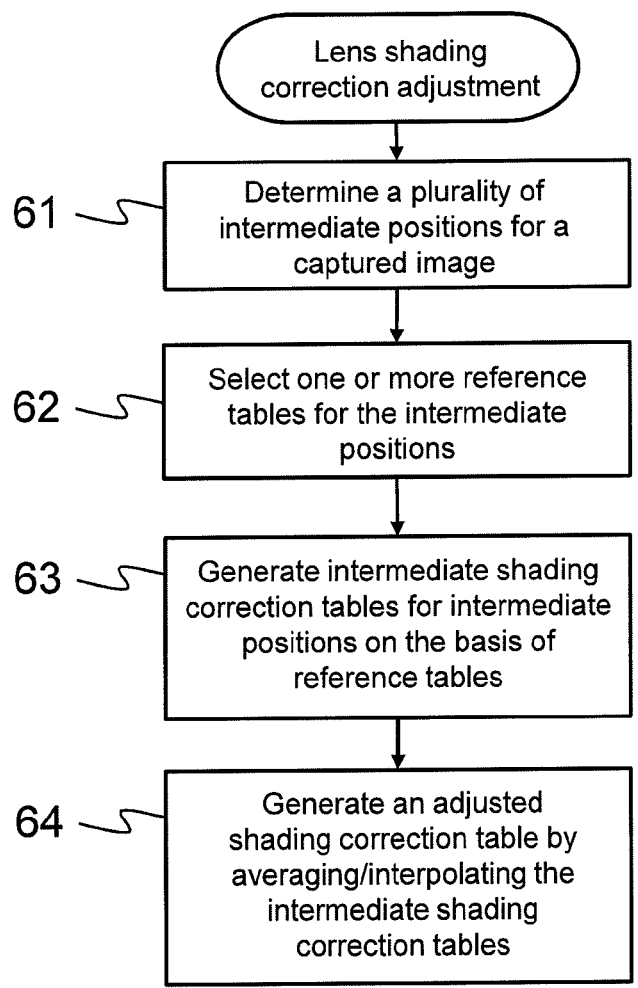
FIG. 6 illustrates lens shading correction adjustment according to yet another example embodiment.

FIG. 6 illustrates lens shading correction adjustment according to yet another example embodiment. For example the phase 23 in FIG. 2 may be implemented as shown in FIG. 6.

In phase 61 a plurality of intermediate positions are determined for the captured image on the basis of the system change information. In phase 62, one or more reference correction tables are selected on the basis of the plurality of intermediate positions and the selected reference correction tables are used to generate an intermediate shading correction table for each intermediate position phase 63. The reference correction tables for a particular intermediate position may be selected on the basis of the difference between the determined intermediate position and positions associated with the reference tables. The difference may be distance or angle, for example.

In an example embodiment, if an intermediate position matches one reference table, that reference table is selected for that intermediate position and used as the intermediate shading correction table for that intermediate position. This may be performed the same way as phase 53 in FIG. 5.

In an example embodiment, if the intermediate position is close to two or more reference tables, the closest reference tables are selected for that intermediate position and combined to form the intermediate shading correction table for that intermediate position. The combination is performed by averaging or interpolating the selected reference correction tables. This may be performed the same way as phase 54 in FIG. 5.

Then in phase 64, an adjusted shading correction table is generated by taking an average of or interpolating the intermediate shading correction tables.

In an example embodiment different reference correction table is used for different intermediate positions in method shown in FIG. 6. Each intermediate position may use its own reference table, or some intermediate positions may use one reference table while other intermediate positions use another one, for example. In an example intermediate positions residing in the upper right hand corner use one reference table while intermediate positions residing in the upper left hand corner use a different reference table etc.

In an example embodiment, mapping between an average or intermediate position and a reference table is not necessarily 1 to 1 mapping. In an example, mapping is done as follows:
position XY(1; 1)=>MAP(1; 1),
position XY(1; 2)=>MAP(1; 2), and
position XY(1; 1.5)=> average/interpolation of MAP(1; 1) and MAP(1; 2) effectively resulting in MAP(1; 1.5).

The mapping function "=>" may include a model of changing lens shading performance (and corresponding lens shading correction) as a function of system change or position information.

Different camera modules may have different reference tables. I.e. the reference table(s) may be camera module dependent. The reference table(s) may be calibrated in connection with manufacturing the camera module at a module factory, or certain defaults correction grids may be adjusted by using calibration information provided by camera module manufacturer, for example. In this way it is possible to obtain reference table(s) that match characteristics of a specific camera module.

In an example embodiment the adjustment of the lens shading correction is performed separately for upper part of the image and lower part of the image by using different system change or position information for the upper and lower parts. The differences between the upper and lower part may be linearly approximated. This approach may be well suited for rolling shutter cameras in which all lines of an image are not exposed at the same time.

In an example, the adjustment of the lens shading correction for the upper part of the image is performed by using data from a data set of lens_position (10 ms×n) where n=0, 1 ... n, while for the lower part data from a data set of lens_position (10 ms×n+1/fps), where fps is the frame rate, is used. The 10 ms in this example is the time between system change (or position) information measurements, i.e. the lens position is measured once every 10 ms. Clearly this can be different in some other example like mentioned above in connection with FIG. 3.

At least some features of the present invention may be implemented in software, hardware, application logic or a combination of software, hardware and/or application logic. The software, application logic and/or hardware may reside on any suitable imaging apparatus, such as a camera, or a mobile phone or a portable computing device having imaging capabilities.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a camera or other imaging apparatus, with one example of an imaging apparatus described and depicted in FIG. 7 below. The computer-readable medium may be a digital data storage such as a data disc or diskette, optical storage, magnetic storage, holographic storage, phase-change storage (PCM) or opto-magnetic storage. The computer-readable medium may be formed into a device without other substantial functions than storing memory or it may be formed as part of a device with other functions, including but not limited to a memory of a computer, a chip set, and a sub assembly of an electronic device.

Figure 7:
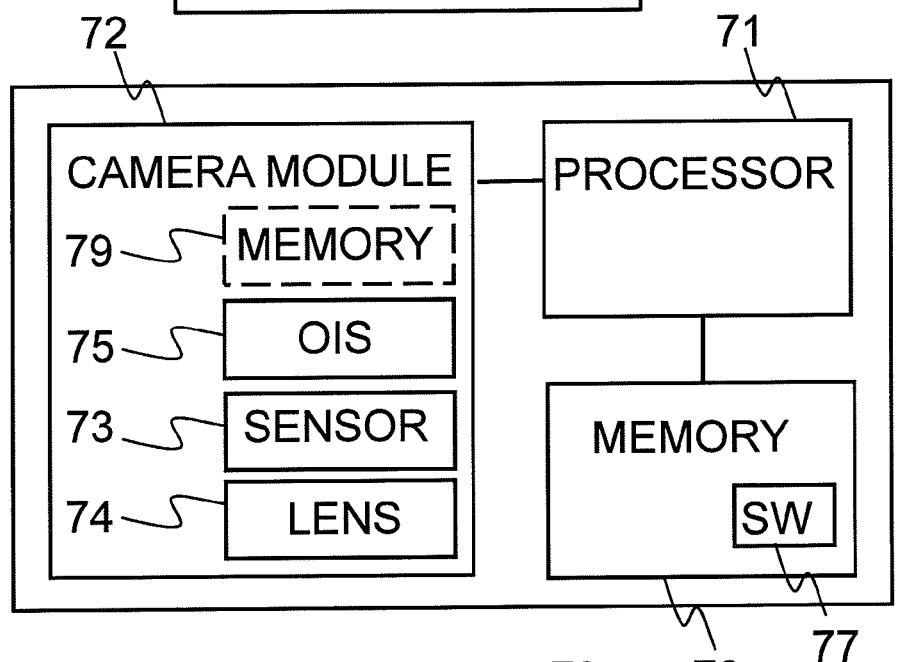
FIG. 7 shows a block diagram of an apparatus according to an example embodiment.

FIG. 7 shows an example block diagram of an imaging apparatus 70 according to an example embodiment of the invention.

The apparatus 70 comprises a camera module 72, at least one memory 76 configured to store computer program code (or software) 77. The apparatus 70 further comprises at least one processor 71 for controlling at least some part of the operation of the apparatus 70 using the computer program code 77.

The camera module 72 comprises a camera lens 74, an image sensor 73 and an optical image stabilization unit 75. The camera module 72 is configured to capture images using the lens 74 and the sensor 73. The optical image stabilization unit 75 can be referred to as an OIS drive unit as well. Furthermore, the camera module comprises an optional calibration memory 79 shown with dashed line. The calibration memory 79 may be an image sensor embedded one time programmable (OTP) calibration memory or alternatively a separate component inside the camera module 72. The calibration memory may be configured to store shading correction tables, The at least one processor 71 may be a master control unit (MCU). Alternatively, the at least one processor 71 may be a microprocessor, a digital signal processor (DSP), an application specific integrated circuit (ASIC), a field programmable gate array, a microcontroller or a combination of such elements. FIG. 7 shows one processor 71, but the apparatus 70 may comprise a plurality of processors 71. The at least one memory 76 may be, for example, random access memory, flash memory, hard disk, hard disk array, optical storage, memory stick, memory card and/or magnetic memory.

A skilled person appreciates that in addition to the elements shown in FIG. 7, the apparatus 70 may comprise other elements, such as user interfaces, displays, as well as communication units, and other additional circuitry such as input/output (I/O) circuitry, memory chips, and the like. Additionally, the apparatus 70 may comprise a disposable or rechargeable battery (not shown) for powering the apparatus 70.

As to the operations of at least some example embodiments of the invention, when the computer program code 77 is executed by the at least one processor 71, this causes the apparatus 70 to implement adjustment of a lens shading function to account for changes caused by optical image stabilization.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. It is also noted that the above embodiments are used merely to explain selected aspects or steps that may be utilized in implementations of the present invention. Some features may be presented only with reference to certain example embodiments of the invention. It should be appreciated that corresponding features may apply to other embodiments as well.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
using an optical image stabilization function in an imaging apparatus comprising a lens and an image sensor;
acquiring system change information, the system change information concerning changes that affect optical path through the lens to the image sensor during capturing of an image through the lens;
adjusting a lens shading correction function on the basis of the acquired system change information; and
applying the adjusted lens shading correction function to image data representing the captured image,
wherein adjusting the lens shading correction function is performed by:
determining a plurality of intermediate positions for the captured image on the basis of the system change information, the system change information comprising more than one piece of system change information;
selecting one or more reference correction tables for the intermediate positions;
generating an intermediate shading correction table for the intermediate positions on the basis of the one or more reference correction tables; and
generating an adjusted shading correction table on the basis of the intermediate shading correction tables.

2. The method of claim 1, wherein the system change information comprises information about position of the lens in relation to the image sensor.

3. The method of claim 1, wherein the system change information comprises one or more of the following: lens position information, image sensor position information, tilting angle information, information about lens properties and control information causing changes in optical path through the lens to the image sensor.

4. The method of claim 1, further comprising acquiring the system change information in metadata attached to the image data representing the captured image.

5. The method of claim 1, further comprising acquiring the system change information by reading it from a stabilization unit controlling the optical image stabilization.

6. The method of claim 1, wherein adjusting the lens shading correction function is performed by:
calculating an average position for the captured image on the basis of the system change information;
generating an adjusted shading correction table by shifting a default correction table by a difference between the calculated average position and a default position of the default correction table.

7. The method of claim 1, further comprising:
using different reference correction tables for at least some of the intermediate positions.

8. A method comprising:
using an optical image stabilization function in an imaging apparatus comprising a lens and an image sensor;
acquiring system change information, the system change information concerning changes that affect optical path through the lens to the image sensor during capturing of an image through the lens;
adjusting a lens shading correction function on the basis of the acquired system change information; and
applying the adjusted lens shading correction function to image data representing the captured image,
wherein adjusting the lens shading correction function is performed by:
determining an average position for the captured image on the basis of the system change information;
selecting one or more reference correction tables for the average position; and
generating an adjusted shading correction table on the basis of the one or more reference correction tables.

9. An apparatus comprising:
a lens and an image sensor configured to capture images and to provide image data representing captured images;
a stabilization unit configured to control optical path through the lens to the image sensor during capturing of images through the lens to provide optical image stabilization;
a processing unit configured to cause the apparatus to perform
acquiring system change information, the system change information concerning changes that affect the optical path through the lens to the image sensor during capturing of an image through the lens;
adjusting a lens shading correction function on the basis of the acquired system change information; and
applying the adjusted lens shading correction function to the image data representing the captured image,
wherein the processing unit is configured to cause the apparatus to perform adjusting the lens shading correction function by:
determining a plurality of intermediate positions for the captured image on the basis of the system change information, the system change information comprising more than one piece of system change information;
selecting one or more reference correction tables for the intermediate positions;
generating an intermediate shading correction table for the intermediate positions on the basis of the one or more reference correction tables; and
generating an adjusted shading correction table on the basis of the intermediate shading correction tables.

10. The apparatus of claim 9, wherein the system change information comprises information about position of the lens in relation to the image sensor.

11. The apparatus of claim 9, wherein the processing unit is configured to cause the apparatus to perform adjusting the lens shading correction function by:
calculating an average position for the captured image on the basis of the system change information;
generating an adjusted shading correction table by shifting a default correction table by a difference between the calculated average position and a default position of the default correction table.

12. The apparatus of claim 9, further comprising:
using different reference correction tables for at least some of the intermediate positions.

13. An apparatus comprising:
a lens and an image sensor configured to capture images and to provide image data representing captured images;
a stabilization unit configured to control optical path through the lens to the image sensor during capturing of images through the lens to provide optical image stabilization;
a processing unit configured to cause the apparatus to perform
acquiring system change information, the system change information concerning changes that affect the optical path through the lens to the image sensor during capturing of an image through the lens;
adjusting a lens shading correction function on the basis of the acquired system change information; and applying the adjusted lens shading correction function to the image data representing the captured image, wherein the processing unit is configured to cause the apparatus to perform adjusting the lens shading correction function by:

determining an average position for the captured image on the basis of the system change information;

selecting one or more reference correction tables for the average position; and generating an adjusted shading correction table on the basis of the one or more reference correction tables.

14. A non-transitory computer readable medium embodying a computer program comprising computer executable program code which, when executed by at least one processor of an apparatus, causes the apparatus to perform:

acquiring system change information, the system change information concerning changes that affect optical path through a lens to an image sensor during capturing of an image through the lens;

receiving image data representing the image captured through the lens;

adjusting a lens shading correction function on the basis of the acquired system change information; and applying the adjusted lens shading correction function to the image data, wherein the computer executable program code causes the apparatus to perform adjusting the lens shading correction function by:

determining a plurality of intermediate positions for the captured image on the basis of the system change information, the system change information comprising more than one piece of system change information;

selecting one or more reference correction tables for the intermediate positions;

generating an intermediate shading correction table for the intermediate positions on the basis of the one or more reference correction tables; and generating an adjusted shading correction table on the basis of the intermediate shading correction tables.

15. A non-transitory computer readable medium embodying a computer program comprising computer executable program code which, when executed by at least one processor of an apparatus, causes the apparatus to perform:

acquiring system change information, the system change information concerning changes that affect optical path through a lens to an image sensor during capturing of an image through the lens;

receiving image data representing the image captured through the lens;

adjusting a lens shading correction function on the basis of the acquired system change information; and applying the adjusted lens shading correction function to the image data, wherein the computer executable program code causes the apparatus to perform adjusting the lens shading correction function by:

determining an average position for the captured image on the basis of the system change information;

selecting one or more reference correction tables for the average position; and generating an adjusted shading correction table on the basis of the one or more reference correction tables.

* * * * *